(12) United States Patent
Zhu

(10) Patent No.: US 11,325,529 B2
(45) Date of Patent: May 10, 2022

(54) EARLY BRAKE LIGHT WARNING SYSTEM FOR AUTONOMOUS DRIVING VEHICLE

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 137 days.

(21) Appl. No.: 16/905,623

(22) Filed: Jun. 18, 2020

(65) Prior Publication Data

US 2021/0394671 A1 Dec. 23, 2021

(51) Int. Cl.
*B60Q 1/44* (2006.01)
*B60W 40/09* (2012.01)
*G05D 1/00* (2006.01)

(52) U.S. Cl.
CPC ........... *B60Q 1/44* (2013.01); *B60W 40/09* (2013.01); *G05D 1/0088* (2013.01); *B60W 2520/105* (2013.01)

(58) Field of Classification Search
CPC ... B60Q 1/44; B60W 40/09; B60W 2520/105; G05D 1/0088
See application file for complete search history.

(56) References Cited

U.S. PATENT DOCUMENTS

2015/0025737 A1* 1/2015 Hermsen ............... B60T 17/221
701/33.9
2017/0120804 A1* 5/2017 Kentley ............... B60W 30/08

* cited by examiner

*Primary Examiner* — Omeed Alizada
(74) *Attorney, Agent, or Firm* — Womble Bond Dickinson (US) LLP

(57) ABSTRACT

In one embodiment, the invention describes a method of providing advance braking warning before an ADV reaches a point where the ADV is expected to brake. The method enables brake lights to be turned on before actual braking occurs, thus providing trailing vehicles more time to respond. According to the method, a trajectory is generated at a starting point. The trajectory includes a number of discrete points that the ADV is to follow. One or more discrete points are identified from the number of discrete points where the ADV is expected to brake based on previous driving statistics and calculated decelerations. At a predetermined time prior to reaching each of the identified discrete points, the ADV can turn on its brake lights to warn trailing vehicles that the ADV is about to brake so that the trailing vehicle can start to respond earlier.

20 Claims, 9 Drawing Sheets

| Control Commands (e.g., throttle, steering) | Current Speed/ Steering Angle | Target Acceleration | Target Steering Angle | ... |
|---|---|---|---|---|
| Command 1 | | | | |
| Command 2 | | | | |
| ... | ... | ... | ... | |
| 501 | 502 | 503 | 504 | |

EARLY BRAKE LIGHT WARNING SYSTEM FOR AUTONOMOUS DRIVING VEHICLE

TECHNICAL FIELD

Embodiments of the present disclosure relate generally to operating autonomous vehicles. More particularly, embodiments of the disclosure relate to turning on brake lights of a leading vehicle before actual braking to give a trailing vehicle more time to respond.

BACKGROUND

An autonomous driving vehicle (ADV) is a vehicle operating in an autonomous mode (e.g., driverless). An ADV can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Like a vehicle driven by a human driver, an ADV may face the same challenge of avoiding collisions on a road with heavy traffic. The occurrence of collisions between trailing and leading vehicles has been one of the leading causes of traffic accidents, partly because when a leading vehicle suddenly brakes, a trailing vehicle does not have enough time to apply its brake either automatically or by a human driver. Currently there is no known effective solution to the problem except educating human drivers or programing vehicles to maintain a sufficient distance from a leading vehicle.

BRIEF DESCRIPTION OF THE DRAWINGS

Embodiments of the disclosure are illustrated by way of example and not limitation in the figures of the accompanying drawings in which like references indicate similar elements.

FIG. 5 shows an example of the profile table according to one embodiment.

DETAILED DESCRIPTION

Figure 1:
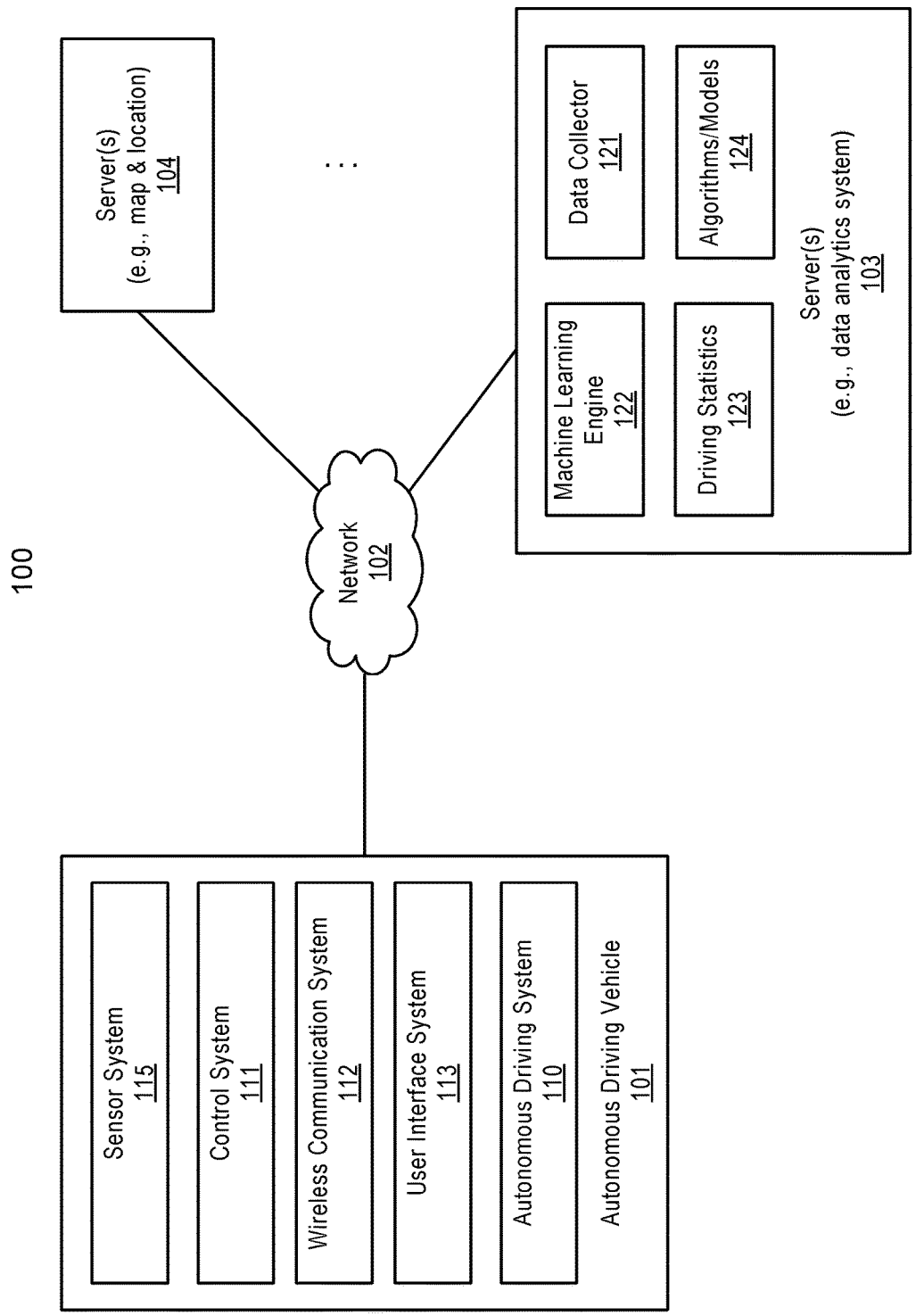
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to various embodiments, described herein are systems and methods for providing an advance braking warning before an ADV reaches a point where the ADV is expected to brake. Brake lights of the ADV is directly linked to a brake paddle, and can be turned on when the force is applied to the brake paddle. The embodiments described herein enable the brake lights to be turned on before actual braking occurs, thus providing trailing vehicles more time to respond.

According to one embodiment, a trajectory is generated at a starting point. The trajectory includes a number of discrete points that the ADV is to follow. One or more discrete points are identified from the number of discrete points on the trajectory where the ADV is expected to brake based on previous driving statistics and calculated decelerations. At a predetermined time (e.g., 2 seconds) prior to reaching each of the identified discrete points, the ADV can turn on its brake lights to warn trailing vehicles that the ADV is about to brake so that the trailing vehicle can start to respond earlier.

In one embodiment, the previous driving statistics are stored in a profile table, which includes entries, each of which maps a current speed, an expected deceleration, and a brake command that decelerates the ADV from the current speed to the expected deceleration.

In one embodiment, to identify the one or more discrete points based on the previous driving statistics, the ADV first determines a segment from the trajectory that the ADV is to travel within a predetermined period of time, e.g., the first two seconds. For each discrete point within the determined segment, the ADV locates a matching entry in the profile table based on a current speed of the ADV at the starting point and an expected deceleration of each discrete point. The ADV then identifies a brake command from the matching entry, and determines whether a braking range of the brake command exceeds a threshold. The ADV then tags the discrete point on the trajectory as a braking point.

In one embodiment, to identify the one or more discrete points based on the calculated decelerations, the ADV calculates an average deceleration for each discrete point on the trajectory. The calculation is based on a current speed of the ADV at the starting point, an expected speed of the discrete point, and a duration from a current time at the starting point to an expected time at each discrete point. The ADV then determines whether the absolute value of the average deceleration exceeds a predetermined threshold, and tags the discrete point as a braking point when the average deceleration exceeds the predetermined threshold.

Autonomous Driving Vehicle

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
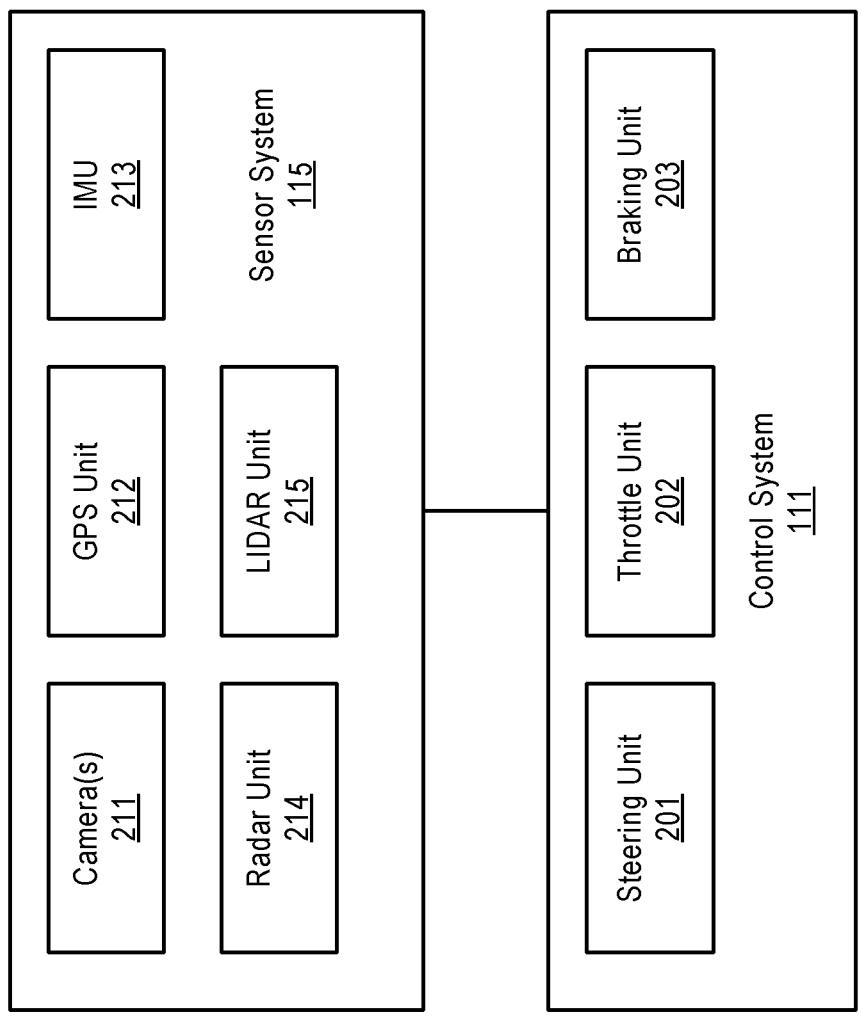
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms 124 include an algorithm to determine and to perform early braking warning. Algorithms 124 can then be uploaded on ADVs to be utilized during autonomous driving in real-time.

Figure 3A:
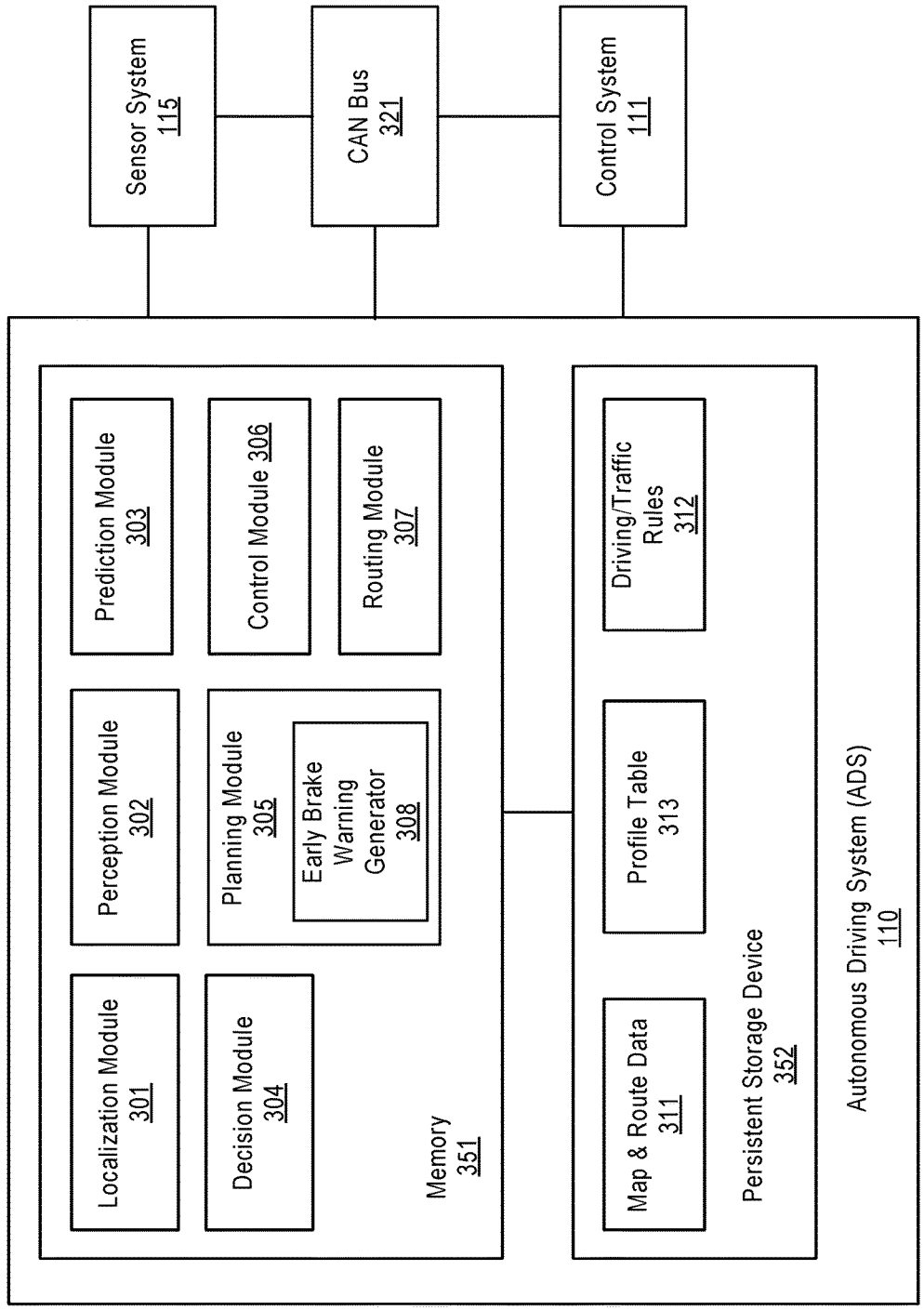
FIGS. 3A-3B are block diagrams illustrating an example of a perception and planning system used with an autonomous vehicle according to one embodiment.
Figure 3B:
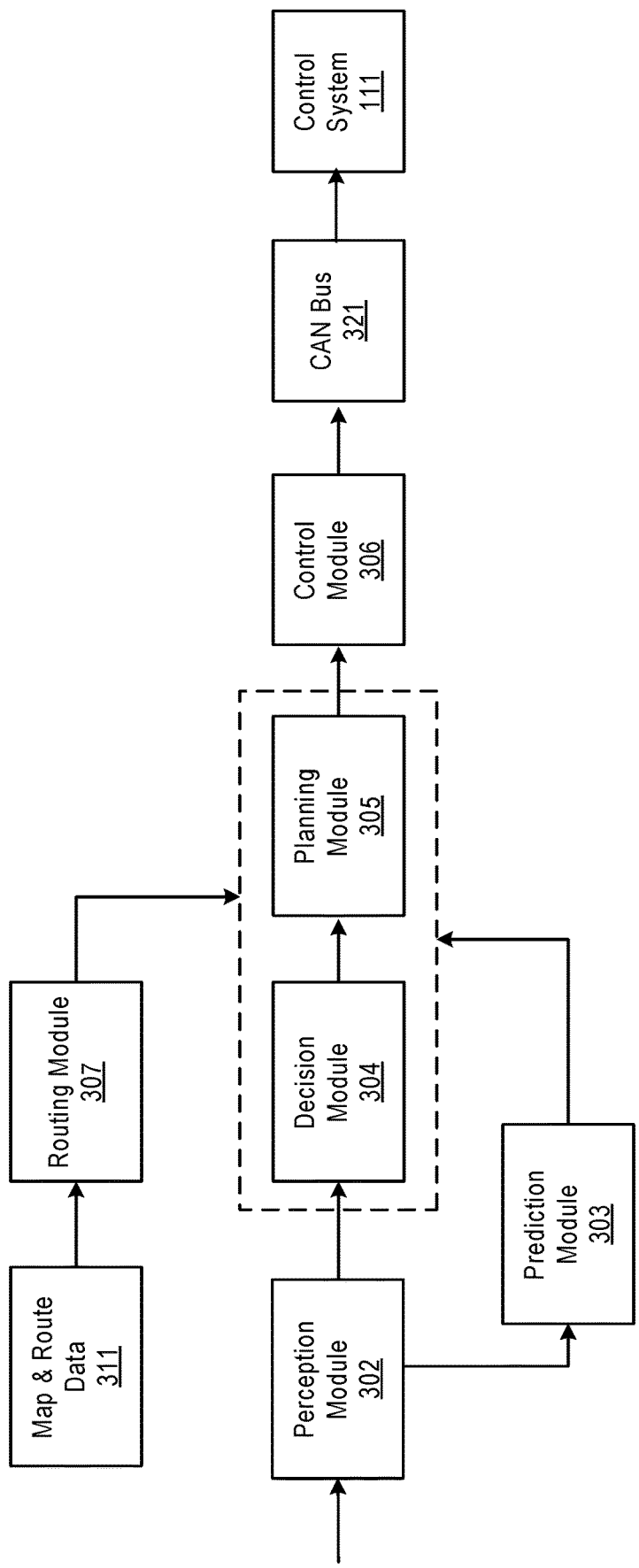

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route or trajectory for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111 via a CAN bus module 321, according to a trajectory (also referred to as a route or path) defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Planning module 305 can include an advance braking warning component 308 for generate braking signals to enable the ADV to turn on brake lights prior to the occurrence of actual braking, thereby giving a trailing vehicle more time to respond.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Advance Braking Warnings

Figure 4:
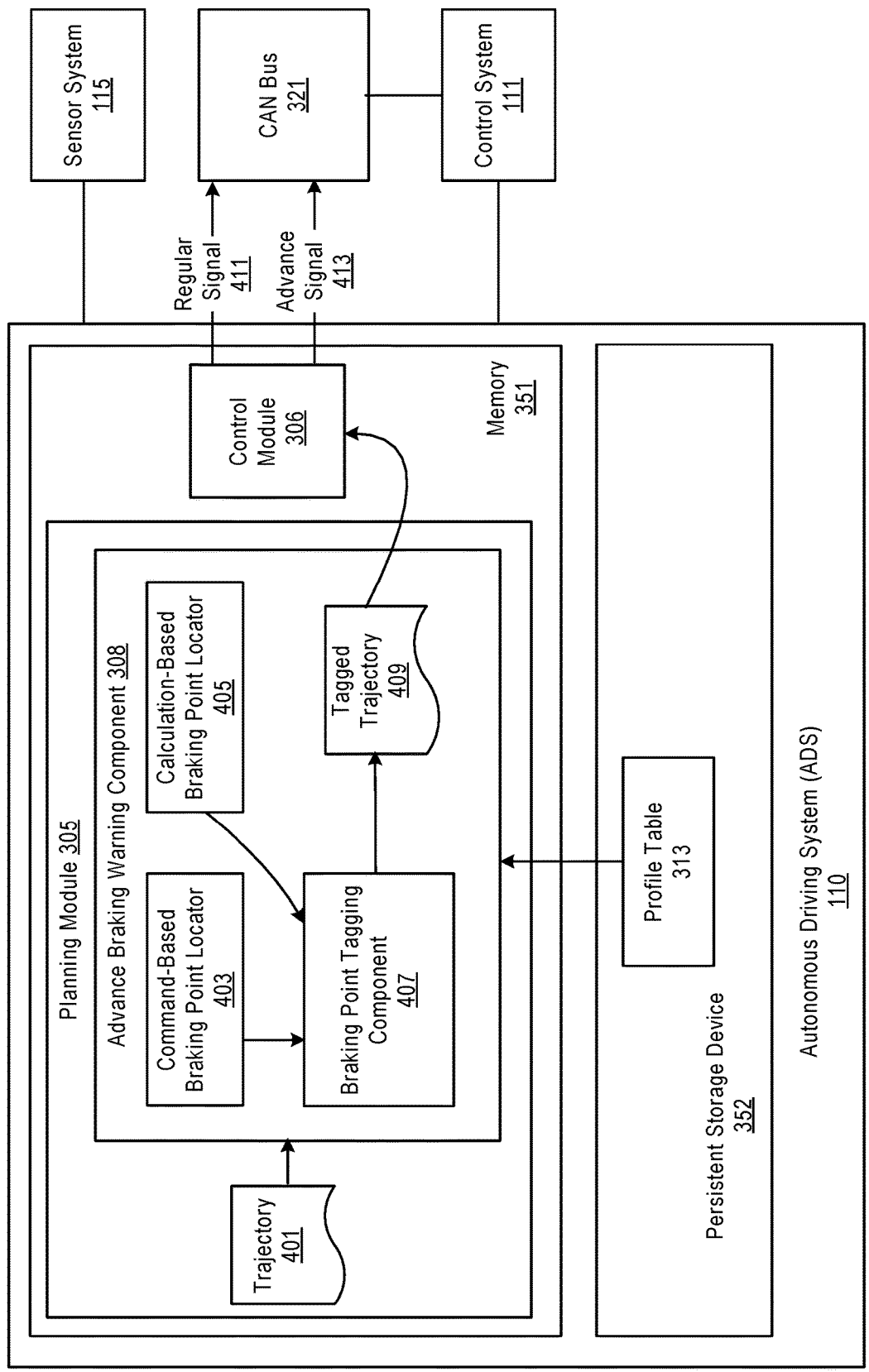
FIG. 4 illustrates an example of a system for providing advance braking warnings according to one embodiment.

FIG. 4 illustrates an example of a system for providing advance braking warnings according to one embodiment. As shown in the figure, the advance braking warning component 308 can be provided in the planning module 305 to identify braking points on a trajectory 401. The advance braking warning component can include a command-based braking point locator 403 and a calculation based braking point locator 405. The two braking point locators can be used simultaneously to detect braking points on the trajectory 401.

As described above, when an ADV is travelling on a road segment, a reference line in the form of a topographic map can be generated for each possible route from a staring location of the road segment to a destination location, to represent an ideal path without any interference from others such as other vehicles, obstacles, or traffic condition. Based on the reference line, a trajectory can be periodically adjusted based on real-time traffic conditions as the ADV moves from the starting point to the destination point. A trajectory can be generated during each driving cycle or each several driving cycles.

In one embodiment, the trajectory 401 can include a series of discrete points, which are pieced together to form the trajectory. Each discrete point on the trajectory 401 can be associated with a position, a time, and a deceleration. The location of the ADV when generating the trajectory is the starting point of the trajectory 401. Each discrete point on the trajectory 401 can have a position represented by GPS coordinates. Each discrete point can also be associated with a time at which the ADV is expected to reach the discrete point, an expected speed of the ADV at the time, and an expected deceleration of the ADV at the time.

In one embodiment, the advance braking warning component 308 can access a profile table 313 which stores previous driving statistics collected from various vehicles driving under different driving environments, for example, different vehicle loads, weather conditions, and road surface conditions, etc. A profile table can be created for a different driving environment category. At real-time, one of the profile table can be selected to match the driving conditions. For example, the profile table 313 has been selected in the embodiment described in FIG. 4.

The command-based braking point locator 403 can detect braking points within a segment of the trajectory 401. The trajectory segment can be the part of the trajectory 401 that the ADV is expected to cover within a specified period of time, e.g., the first two seconds after the trajectory 401 is generated. The detection of braking points within the trajectory segment can be based on the profile table 313 and one or more attributes associated with the discrete points within the trajectory segment.

In one embodiment, for each discrete point on the trajectory segment, the command-based braking point locator 403 can locate a matching entry in the profile table 313, extract a braking command from the matching entry that matches a current speed and an expected deceleration of various points of the trajectory, and compare a braking range of the extracted braking command with a threshold. If the braking range of the extracted command exceed a threshold, e.g., more than 10% above a valid braking range (i.e., 30% of the maximum braking range 100%), then the discrete point corresponding to the extracted command can be tagged as a braking point using a braking point tagging component 407.

In one embodiment, a discrete point can be tagged in a variety of ways such that the control module 306 can recognize the discrete point as a braking point. For example, the discrete point can be tagged using a binary number 1, while a non-braking discrete point can be tagged with a binary number 0 on the trajectory 401.

In one embodiment, the advance braking warning component 308 also applies calculation-based braking point locator 405 to the trajectory 401 to identify additional braking points. Unlike the command-based braking point locator 403 that is applied to an initial segment of the trajectory, the calculation-based braking point locator 405 is applied to the whole trajectory 401.

In one embodiment, the calculation-based braking point locator 405 compares an expected speed associated with each discrete point (except the starting point) on the trajectory 401 with the current speed of the ADV at the starting point, and uses a predetermined algorithm (e.g., a calculus-based algorithm) to calculate an average deceleration of the ADV when reaching that discrete point. If the absolute value of the calculated deceleration exceeds a predetermined threshold, e.g., 1 m/s$^2$, the calculation-based braking point locator 405 can tag the discrete point as a braking point.

In one embodiment, the tagged trajectory 409 can include a tag on each discrete point that indicates whether the discrete point is a braking point or a non-braking point, and can be passed to the control module 306. The control module 305 can send the information of the tagged trajectory (e.g., indication whether the ADV is braking) to the CAN bus module 321, which can interpret the information and send an advance signal 413 to the control system 111 to turn on brake lights of the ADV at a predetermined time prior to the ADV reaching each tagged braking point.

For example, the predetermined time can be 2 seconds, which is a duration between the turning-on of the brake lights and the actual occurrence of the expected braking. Since the control module can also send a regular signal 411 to the CAN bus 321 to turn on the brake lights when the actual braking occurs, a driver in a trailing vehicle may see the brake lights of the ADV to be turned on twice for each occurrence of actual braking.

Typically, an experienced driver or a well-programmed driverless vehicle maintains a safe driving distance from a leading vehicle. The safe driving distance provides a cushion to allow the training vehicle to slow down to avoid a collision with the leading vehicle. The advance braking warning can provide additional distance and time for a training vehicle to take action to avoid colliding with the leading vehicle.

FIG. 5 shows an example of a profile table 500 according to one embodiment. As shown, the profile table 500 can be an example of the profile table 313 described in FIG. 3A and FIG. 4, and can include a number of entries. Each entry in the profile table 313 maps a particular control command 501 and a particular speed 502 to an acceleration 503 or a steering angle 504 dependent upon the type of control command 501. Data for the entries in the profile table 500 is collected from a particular driving environment.

In one embodiment, the control command 501 can be a throttle or brake command that is issued at the current speed 502. A response from the vehicle can be the acceleration 503, where a positive value represents acceleration and a negative value represents deceleration. The control command 501 can be a steering command, and the response of the vehicle can be steering angle 504 from a current steering angle.

Multiple profile tables, each for a different driving environment, can be uploaded to an ADV for use in calibrating control commands at real-time during the autonomous driving.

In one embodiment, for each of the trajectory points of a trajectory, the expected speed and acceleration (or deceleration) of the corresponding trajectory point can be identified, which have been determined by planning module 305. Based on the speed and acceleration of the trajectory point, a lookup is performed in a control profile such as the control profile as shown in FIG. 5. A matching entry is located that matches speed 502 and acceleration 503. A throttle/brake command 501 can be extracted from the matching entry. Based on the throttle/brake command 501 (e.g., positive means throttle, negative means braking), it can be determined whether the ADV is on the way to brake and a brake warning signal may be generated.

Figure 6:
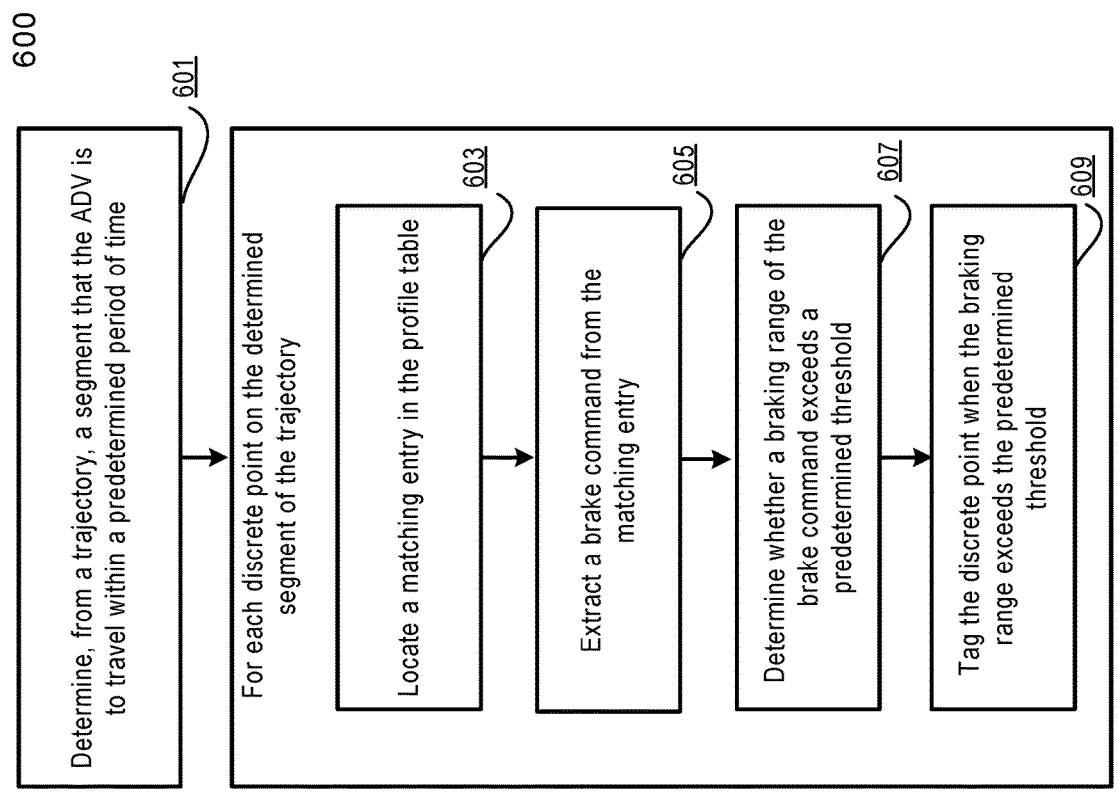
FIG. 6 illustrates an example of a process of locating braking points on a trajectory using a command-based approach according to one embodiment.

FIG. 6 illustrates an example of a process 600 of locating braking points on a trajectory using a command-based approach according to one embodiment. Process 600 may be performed by a processing logic that which include software, hardware, or a combination thereof. For example, process 600 may be performed by the command-base braking point locator 403 described in FIG. 4.

As shown in FIG. 6, in operation 601, the processing logic determines, from a trajectory, a segment that an ADV is to travel within a predetermined period of time. When the trajectory is generated at a starting position and a starting position, the ADV can be travelling at a speed (referred to as a current speed of the ADV). Each of the remaining discrete points on the trajectory can be associated with a time at which the ADV is expected to reach the discrete point, an expected speed of the ADV at the time, and an expected deceleration of the ADV at the time. Each discrete points on the trajectory and the associated attributes of each discrete points on the trajectory can be recorded in memory while the ADV is motion.

The processing logic can determine a number of points in a trajectory segment corresponding to the first n number of seconds, where n is predetermined. For example, if n is 2, then the processing logic can determine the number of discrete points in a segment that the ADV is expected to cover in the first 2 seconds after the trajectory is generated.

For each of the number of discrete points within the trajectory segment, the processing logic can perform the following operations:

In operation 603, the processing logic locates a matching entry in the profile table based on a current speed of the ADV at the starting point and an expected deceleration of the discrete point. The matching entry may include a brake command that decelerated a similarly-situated vehicle to the expected deceleration based on previous driving statistics. The similarly-situated vehicle may possess similar specifications (e.g. the same model) as the ego ADV, and were travelling at the current speed of the ADV under similar driving conditions as the ADV is currently experiencing.

In operation 605, the processing logic extracts the brake command from the matching entry. The force of the brake command can be expressed using a percentage, which represents a range (e.g., 45%) of the maximum braking range (i.e., 100%) that a brake pedal can be pressed.

In operation 607, the processing logic determines whether the braking range of the brake command exceeds a predetermined threshold. For example, the predetermined threshold can be 10% more than a valid braking range (e.g., 35% of the maximum braking range) of the ADV. The valid braking range represents a braking force that can brake the vehicle to a stop. The 10% more than the valid braking range is to reduce the number of inaccurate braking points, since the previous driving statistics may not completely reflect the current driving conditions.

In operation 609, the processing logic tags the discrete point as a braking point when the braking range exceeds the predetermined threshold. Those discrete points within the trajectory segment can also be tagged as non-braking points.

Figure 7:
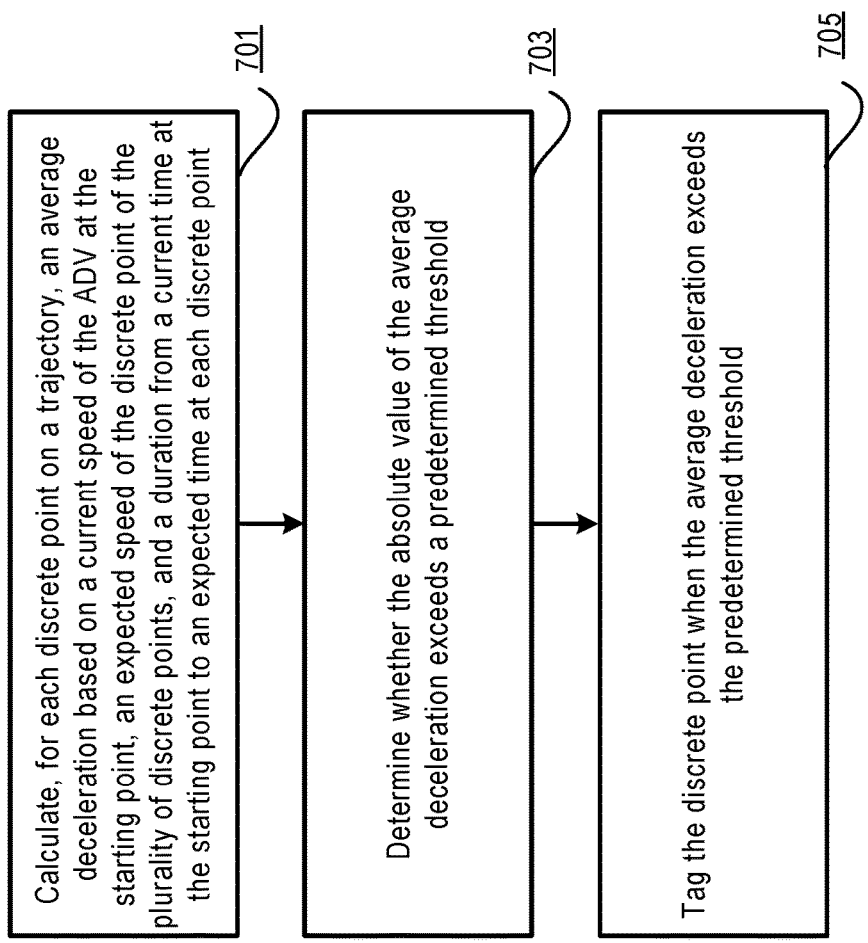
FIG. 7 illustrates an example of a process of locating braking points on a trajectory using a calculation-based approach according to one embodiment.

FIG. 7 illustrates an example of a process 700 of locating braking points on a trajectory using a calculation-based approach according to one embodiment. Process 700 may be performed by a processing logic which may include software, hardware, or a combination thereof. For example, process 700 may be performed by the calculation-base braking point locator 405 described in FIG. 4.

As shown in FIG. 7, the processing logic performs the following operations for each discrete point on a trajectory, including those braking points within the trajectory segment described in FIG. 7.

In operation 701, the processing logic calculates an average deceleration based on a current speed of the ADV at the starting point, an expected speed of the ADV at each discrete point on the trajectory (except the starting point), and a duration from a current time at the starting point to an expected time at each discrete point.

In operation 703, the processing logic determines whether the absolute value of the average deceleration exceeds a predetermined threshold.

In operation 705, the processing logic tag the discrete point if the absolute value of the calculated average deceleration exceeds a predetermined threshold, e.g., 1 m/s$^2$.

In one embodiment, because the approaches described in FIGS. 6 and 7 are applied to the same trajectory simultaneously, each discrete point within the identified trajectory segment may be tagged twice. Further, one approach may identify a particular discrete point as a braking point within the trajectory segment while the other approach may identify the same discrete point as a non-braking point. In such a situation, that discrete point would be treated as a braking point.

As an example to illustrate the calculation-based approach, the current speed of the ADV is 35 mph at the starting point of the trajectory, and the time at the starting point is t0. The trajectory can include discrete A, discrete point B, discrete point C, and discrete point N. Each of the discrete points has a position represented using GPS coordinates, an expected speed and an expected time when the ADV reaches the discrete point. The processing logic can iteratively calculate an average deceleration between the starting point and each of the discrete points A, B, C and N, based on the current speed of the ADV, the expected speed at each of the discrete points, and the expected time when the ADV reaches the discrete point. If the absolute value of an average deceleration between the starting point and any of the discrete points exceeds a threshold, that discrete point would be marked as a braking point.

Figure 8:
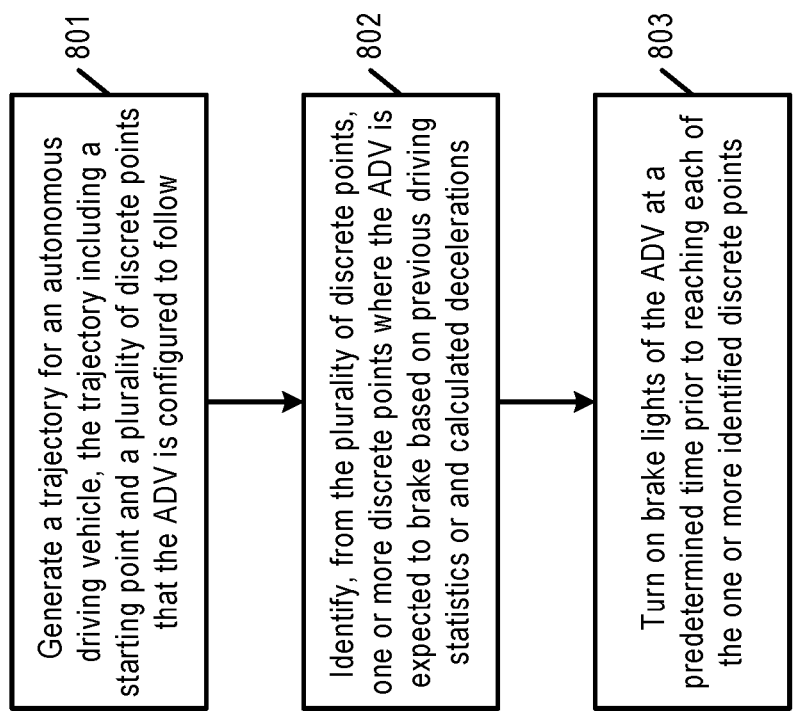
FIG. 8 illustrates an example of a process of providing advance braking warnings according to one embodiment.

FIG. 8 illustrates an example of a process of providing advance braking warnings according to one embodiment. Process 800 may be performed by processing logic which may include software, hardware, or a combination thereof. For example, process 800 may be performed by the advance braking warning component 308 in FIG. 4.

As shown in FIG. 8, in operation 801, the processing logic generates a trajectory for the ADV, wherein the trajectory includes a starting point and a plurality of discrete points that the ADV is configured to follow. In operation 803, the processing logic identifies, from the plurality of discrete points, one or more discrete points where the ADV is expected to brake based on previous driving statistics or calculated decelerations. In operation 805, the processing logic turns on brake lights of the ADV at a predetermined time prior to reaching each of the one or more identified discrete points.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of providing advance brake warnings in an autonomous driving vehicle (ADV), comprising:
   generating a trajectory for the ADV, wherein the trajectory includes a starting point and a plurality of discrete points that the ADV is configured to follow;
   identifying, from the plurality of discrete points, one or more discrete points where the ADV is expected to brake based on previous driving statistics and calculated decelerations; and
   turning on brake lights of the ADV at a predetermined time prior to reaching each of the one or more identified discrete points.

2. The method of claim 1, wherein the previous driving statistics are stored in a profile table, which includes a plurality of entries, each entry mapping a current speed, an expected deceleration, and a brake command that decelerates the ADV travelling at the current speed to the expected deceleration.

3. The method of claim 2, wherein identifying the one or more discrete points based on the previous driving statistics further comprises:
   determining, from the trajectory, a segment that the ADV is to travel within a predetermined period of time;
   for each discrete point on the determined segment of the trajectory,
      locating a matching entry in the profile table based on a current speed of the ADV at the starting point and an expected deceleration of the discrete point,
      extracting a brake command from the matching entry,
      determining whether a braking range of the brake command exceeds a predetermined threshold,
      tagging the discrete point when the braking range exceeds the predetermined threshold.

4. The method of claim 1, wherein each of the plurality of discrete points includes a plurality of attributes that comprise a time at which the ADV is expected to reach the discrete point, an expected speed of the ADV at the time, and an expected deceleration of the ADV at the time.

5. The method of claim 1, wherein identifying the one or more discrete points based on the calculated decelerations further comprises:
   for each of the plurality of discrete points on the trajectory
      calculating an average deceleration based on a current speed of the ADV at the starting point, an expected speed of the discrete point, and a duration from a current time at the starting point to an expected time at the discrete point;
      determining whether the absolute value of the average deceleration exceeds a predetermined threshold; and
      tagging the discrete point when the average deceleration exceeds the predetermined threshold.

6. The method of claim 1, further comprising:
   passing the trajectory with each discrete point tagged to indicate whether the ADV is expected to brake at the discrete point to a control function in the ADV;
   sending, by the control function, a braking signal to a controller area network (CAN) bus at the predetermined time prior to the ADV reaching each of the one or more identified discrete points.

7. The method of claim 1, wherein at least one discrete point on the trajectory is tagged as a braking point based on both the previous driving statistics and the calculated deceleration.

8. A non-transitory machine-readable medium non-transitory machine-readable medium having instructions stored therein for providing advance brake warnings in an autonomous driving vehicle (ADV), which instructions when executed by a processor, cause the processor to perform operations, the operations comprising:
   generating a trajectory for the ADV, wherein the trajectory includes a starting point and a plurality of discrete points that the ADV is configured to follow;
   identifying, from the plurality of discrete points, one or more discrete points where the ADV is expected to brake based on previous driving statistics and calculated decelerations; and
   turning on brake lights of the ADV at a predetermined time prior to reaching each of the one or more identified discrete points.

9. The non-transitory machine-readable medium of claim 8, wherein the previous driving statistics are stored in a profile table, which includes a plurality of entries, each entry mapping a current speed, an expected deceleration, and a brake command that decelerates the ADV travelling at the current speed to the expected deceleration.

10. The non-transitory machine-readable medium of claim 9, wherein identifying the one or more discrete points based on the previous driving statistics further comprises:
    determining, from the trajectory, a segment that the ADV is to travel within a predetermined period of time;
    for each discrete point on the determined segment of the trajectory,
       locating a matching entry in the profile table based on a current speed of the ADV at the starting point and an expected deceleration of the discrete point,
       extracting a brake command from the matching entry,
       determining whether a braking range of the brake command exceeds a predetermined threshold,
       tagging the discrete point when the braking range exceeds the predetermined threshold.

11. The non-transitory machine-readable medium of claim 8, wherein each of the plurality of discrete points includes a plurality of attributes that comprise a time at which the ADV is expected to reach the discrete point, an expected speed of the ADV at the time, and an expected deceleration of the ADV at the time.

12. The non-transitory machine-readable medium of claim 8, wherein identifying the one or more discrete points based on the calculated decelerations further comprises:
    for each of the plurality of discrete points on the trajectory calculating an average deceleration based on a current speed of the ADV at the starting point, an expected speed of the discrete point, and a duration from a current time at the starting point to an expected time at the discrete point;

determining whether the absolute value of the average deceleration exceeds a predetermined threshold; and tagging the discrete point when the average deceleration exceeds the predetermined threshold.

13. The non-transitory machine-readable medium of claim 8, wherein the operations further comprise:

passing the trajectory with each discrete point tagged to indicate whether the ADV is expected to brake at the discrete point to a control function in the ADV;

sending, by the control function, a braking signal to a controller area network (CAN) bus at the predetermined time prior to the ADV reaching each of the one or more identified discrete points.

14. The non-transitory machine-readable medium of claim 8, wherein at least one discrete point on the trajectory is tagged as a braking point based on both the previous driving statistics and the calculated deceleration.

15. A data processing system, comprising:

a processor; and a memory coupled to the processor to store instructions therein for providing advance brake warnings in an autonomous driving vehicle (ADV), which instructions when executed by the processor, cause the processor to perform operations, the operations comprising:

generating a trajectory for the ADV, wherein the trajectory includes a starting point and a plurality of discrete points that the ADV is configured to follow, identifying, from the plurality of discrete points, one or more discrete points where the ADV is expected to brake based on previous driving statistics and calculated decelerations, and turning on brake lights of the ADV at a predetermined time prior to reaching each of the one or more identified discrete points.

16. The system of claim 15, wherein the previous driving statistics are stored in a profile table, which includes a plurality of entries, each entry mapping a current speed, an expected deceleration, and a brake command that decelerates the ADV travelling at the current speed to the expected deceleration.

17. The system of claim 16, wherein identifying the one or more discrete points based on the previous driving statistics further comprises:

determining, from the trajectory, a segment that the ADV is to travel within a predetermined period of time;

for each discrete point on the determined segment of the trajectory, locating a matching entry in the profile table based on a current speed of the ADV at the starting point and an expected deceleration of the discrete point, extracting a brake command from the matching entry, determining whether a braking range of the brake command exceeds a predetermined threshold, tagging the discrete point when the braking range exceeds the predetermined threshold.

18. The system of claim 15, wherein each of the plurality of discrete points includes a plurality of attributes that comprise a time at which the ADV is expected to reach the discrete point, an expected speed of the ADV at the time, and an expected deceleration of the ADV at the time.

19. The system of claim 15, wherein identifying the one or more discrete points based on the calculated decelerations further comprises:

for each of the plurality of discrete points on the trajectory calculating an average deceleration based on a current speed of the ADV at the starting point, an expected speed of the discrete point, and a duration from a current time at the starting point to an expected time at the discrete point;

determining whether the absolute value of the average deceleration exceeds a predetermined threshold; and tagging the discrete point when the average deceleration exceeds the predetermined threshold.

20. The system of claim 15, wherein the operations further comprise:

passing the trajectory with each discrete point tagged to indicate whether the ADV is expected to brake at the discrete point to a control function in the ADV;

sending, by the control function, a braking signal to a controller area network (CAN) bus at the predetermined time prior to the ADV reaching each of the one or more identified discrete points.

* * * * *